US007804655B2

(12) United States Patent
Shimazawa et al.

(10) Patent No.: US 7,804,655 B2
(45) Date of Patent: Sep. 28, 2010

(54) THERMALLY ASSISTED MAGNETIC HEAD

(75) Inventors: Koji Shimazawa, Tokyo (JP); Kosuke Tanaka, Tokyo (JP); Takaaki Domon, Tokyo (JP)

(73) Assignee: TDK Corporation, Tokyo (JP)

( * ) Notice: Subject to any disclaimer, the term of this patent is extended or adjusted under 35 U.S.C. 154(b) by 533 days.

(21) Appl. No.: 11/889,736

(22) Filed: Aug. 16, 2007

(65) Prior Publication Data
US 2008/0043360 A1   Feb. 21, 2008

(30) Foreign Application Priority Data
Aug. 21, 2006  (JP) .................... P2006-224641

(51) Int. Cl.
*G11B 5/02* (2006.01)
(52) U.S. Cl. ..................... 360/59; 369/13.17
(58) Field of Classification Search ................ None
See application file for complete search history.

(56) References Cited

U.S. PATENT DOCUMENTS

| 6,016,290 | A  | * | 1/2000 | Chen et al. ............. 369/13.17 |
| 6,404,706 | B1 | * | 6/2002 | Stovall et al. ........... 369/13.17 |
| 7,027,248 | B2 | * | 4/2006 | Hamaguchi et al. ........... 360/59 |
| 7,529,158 | B2 | * | 5/2009 | Matsumoto et al. ....... 369/13.33 |
| 2003/0112542 | A1 | * | 6/2003 | Rettner et al. ............... 360/59 |
| 2007/0165494 | A1 | * | 7/2007 | Cho et al. ............... 369/13.32 |
| 2007/0165495 | A1 | * | 7/2007 | Lee et al. ............... 369/13.33 |

FOREIGN PATENT DOCUMENTS

| JP | A 10-162444 | 6/1998 |
| JP | A 2000-173093 | 6/2000 |
| JP | A 2001-255254 | 9/2001 |
| JP | A 2001-283404 | 10/2001 |
| JP | A 2001-325756 | 11/2001 |
| JP | A 2002-298302 | 10/2002 |
| JP | A 2004-158067 | 6/2004 |
| JP | A 2004-303299 | 10/2004 |
| JP | A 2006-185548 | 7/2006 |
| WO | WO 92/02931 | 2/1992 |
| WO | WO 98/09284 | 3/1998 |
| WO | WO 99/53482 | 10/1999 |

OTHER PUBLICATIONS

Miyanishi, et al; (Oct. 2005); "Near-Field Assisted Magnetic Recording"; IEEE Transactions of Magnetics; vol. 41; No. 10 pp. 2817-2821.
Shono, et al; (2005); "Review of Thermally Assisted Magnetic Recording"; vol. 29; No. 1 pp. 5-13.

* cited by examiner

*Primary Examiner*—Jason C Olson
(74) *Attorney, Agent, or Firm*—Oliff & Berridge, PLC

(57) ABSTRACT

A thermally assisted magnetic head has a slider having a medium-facing surface, and a light source unit having a light source support substrate, and a light source disposed on the light source support substrate. The slider has a slider substrate and a magnetic head portion disposed on a side of the medium-facing surface in the slider substrate; the magnetic head portion includes a magnetic recording element for generating a magnetic field, and a waveguide for receiving light through an end face opposite to the medium-facing surface, and guiding the light to the medium-facing surface; the light source support substrate is fixed to a surface opposite to the medium-facing surface in the slider substrate so that light emitted from the light source can enter the end face of the waveguide.

11 Claims, 5 Drawing Sheets

THERMALLY ASSISTED MAGNETIC HEAD

BACKGROUND OF THE INVENTION

1. Field of the Invention

The present invention relates to a thermally assisted magnetic head for writing of signals by thermally assisted magnetic recording and to a head gimbal assembly (HGA) with this thermally assisted magnetic head, and a hard disk drive with this HGA.

2. Related Background of the Invention

As the recording density of the hard disk drive increases, further improvement is demanded in the performance of the thin film magnetic head. The thin film magnetic head commonly used is a composite type thin film magnetic head of a structure in which a magnetic detecting element such as a magneto-resistive (MR) effect element and a magnetic recording element such as an electromagnetic coil element are stacked, and these elements are used to read and write data signals from and into a magnetic disk as a magnetic recording medium.

In general, the magnetic recording medium is a kind of a discontinuous body of fine magnetic particles aggregated, and each of the fine magnetic particles is made in a single magnetic domain structure. A recording bit is composed of a plurality of fine magnetic particles. Therefore, in order to increase the recording density, it is necessary to decrease the size of the fine magnetic particles and thereby decrease unevenness at borders of recording bits. However, the decrease in the size of the fine magnetic particles raises the problem of degradation of thermostability of magnetization due to decrease of volume.

A measure of the thermostability of magnetization is given by $K_U V/k_B T$. In this case, $K_U$ represents the magnetic anisotropy energy of the fine magnetic particles, V the volume of one magnetic particle, $k_B$ the Boltzmann constant, and T absolute temperature. The decrease in the size of fine magnetic particles is nothing but decrease in V, and, without any countermeasures, the decrease in V will lead to decrease of $K_U V/k_B T$ and degradation of the thermostability. A conceivable countermeasure to this problem is to increase $K_U$ at the same time, but this increase of $K_U$ will lead to increase in the coercive force of the recording medium. In contrast to it, the intensity of the writing magnetic field by the magnetic head is virtually determined by the saturation magnetic flux density of a soft magnetic material making the magnetic poles in the head. Therefore, the writing becomes infeasible if the coercive force exceeds a tolerance determined from this limit of writing magnetic field intensity.

As a method of solving this problem of thermostability of magnetization there is the following proposal of so-called thermally assisted magnetic recording: while a magnetic material with large $K_U$ is used, heat is applied to the recording medium immediately before application of the writing magnetic field, to decrease the coercive force, and writing is performed in that state. This recording is generally classified under magnetic dominant recording and optical dominant recording. In the magnetic dominant recording, the dominant of writing is an electromagnetic coil element and the radiation diameter of light is larger than the track width (recording width). On the other hand, in the optical dominant recording, the dominant of writing is a light radiating portion and the radiation diameter of light is approximately equal to the track width (recording width). Namely, the magnetic field determines the spatial resolution in the magnetic dominant recording, whereas the light determines the spatial resolution in the optical dominant recording.

Patent Documents (International Publication WO92/02931 (JP-A 6-500194), International Publication WO98/09284 (JP-A 2002-511176), Japanese Patent Application Laid-Open No. 10-162444, International Publication WO99/53482 (JP-A 2002-512725), Japanese Patent Application Laid-Open No. 2000-173093, Japanese Patent Application Laid-Open No. 2002-298302, Japanese Patent Application Laid-Open No. 2001-255254) and Non-patent Document (Shintaro Miyanishi et al., "Near-field Assisted Magnetic Recording" IEEE TRANSACTIONS ON MAGNETICS, 2005, Vol. 41, No. 10, pp 2817-2821) disclose the thermally assisted magnetic head recording apparatus of this type, in the structure in which a light source such as a semiconductor laser is located at a position apart from a slider with a magnetic recording element for generating a magnetic field and in which light from this light source is guided through an optical fiber, a lens, etc. to a medium-facing surface of the slider.

Furthermore, Patent Documents (Japanese Patent Application Laid-Open No. 2001-283404, Japanese Patent Application Laid-Open No. 2001-325756, Japanese Patent Application Laid-Open No. 2004-158067, Japanese Patent Application Laid-Open No. 2004-303299) and Non-patent Document (Keiji Shono and Mitsumasa Oshiki "Status and Problems of Thermally Assisted Magnetic Recording" Journal of the Magnetics Society of Japan, 2005, Vol. 29, No. 1, pp 5-13) disclose the thermally assisted magnetic head in which the magnetic recording element and the light source are integrated on a side surface of the slider, and the thermally assisted magnetic head in which the magnetic recording element and the light source are integrated on the medium-facing surface of the slider.

SUMMARY OF THE INVENTION

However, when the light source is located at the place far from the slider, the optical fiber, lens, mirror, etc. have to be used over a long distance for guiding light, which poses a problem of large reduction in propagation efficiency of light and a problem of complicated structure of the entire apparatus.

When the light source, in addition to the magnetic recording element, is integrated on the side surface of the slider, the yield of the thermally assisted magnetic head is likely to largely decrease by virtue of synergetic effect of the yield of the magnetic recording element and the yield of the light source.

For example, in the case of a laser diode (semiconductor laser) chip as an example of the light source, such characteristics as the output, the spread angle of laser light, and the life largely vary according to stress on the chip. It is thus necessary to perform characteristic tests of the chip after the chip is mounted on a substrate or the like. As a result, the yield of the magnetic head portion and the yield of the laser diode part both cumulatively affect the production yield of the entire head, so as to heavily degrade the yield of the entire head.

Furthermore, when the magnetic recording element and the light source are integrated on the medium-facing surface of the slider, the yield problem similar to that described above also arises and, because in this method the magnetic recording element and the magnetic detecting element are formed on the medium-facing surface different from the side surface of the slider on which the magnetic recording element and the magnetic detecting element used to be formed, it is difficult to apply the production methods of the conventional magnetic detecting elements, for example, such as the perpendicular conduction giant magneto-resistive (CPP (Current Perpendicular to Plane)-GMR) effect element and the magnetic recording element with the electromagnetic coil for perpendicular magnetic recording, and it is thus very difficult to produce the thermally assisted magnetic head with sufficient performance.

An object of the present invention is therefore to provide a thermally assisted magnetic head that can be produced at an increased yield, that can be produced by applying the production methods of the conventional magnetic recording elements, and that can be constructed in a simple structure, an HGA with this thermally assisted magnetic head, and a hard disk drive with this HGA.

Before explaining the present invention, the terms to be used in the specification are defined as follows. In a multilayer structure of a magnetic head portion formed on an integration surface of a slider, a constituent element on the slider side with respect to a reference layer will be defined as an element located "under" or "below" the reference layer, and a constituent element on the stack side with respect to the reference layer will be defined as an element located "over" or "above" the reference layer.

A thermally assisted magnetic head according to the present invention is a thermally assisted magnetic head comprising: a slider having a medium-facing surface; and a light source unit having a light source support substrate and a light source disposed on the light source support substrate; wherein the slider has a slider substrate and a magnetic head portion disposed on a side of the medium-facing surface in the slider substrate; wherein the magnetic head portion comprises a magnetic recording element for generating a magnetic field, and a waveguide for receiving light through an end face thereof opposite to the medium-facing surface, and guiding the light to the medium-facing surface; wherein the light source support substrate is fixed to a surface opposite to the medium-facing surface in the slider substrate so that light emitted from the light source can enter the end face of the waveguide.

According to the present invention, the magnetic head portion is fixed to the slider substrate and the light source is fixed to the light source support substrate; therefore, the thermally assisted magnetic head as a nondefective device can be produced with a good yield by first independently testing the magnetic recording element fixed to the slider substrate and the light source fixed to the light source support substrate and thereafter fixing the slider as a nondefective unit and the light source unit as a nondefective unit to each other. Since the magnetic head portion is disposed on the side surface of the slider substrate, the magnetic recording element of the magnetic head portion can be readily produced by applying the conventional thin-film magnetic head production methods. Since the light source is located at the position apart from the medium-facing surface and near the slider, it is feasible to suppress adverse effect of heat generated from the light source, on the magnetic recording element and others, and possibilities of contact or the like between the light source and the medium, to reduce propagation loss of light because of dispensability of an optical fiber, a lens, a mirror, etc., and to simplify the structure.

Preferably, the light source is disposed on a side surface of the light source support substrate, which facilitates fixing of the light source to the light source support substrate.

The light source is preferably a laser diode.

Preferably, $\lambda s \leq \lambda l$ is satisfied, where $\lambda s$ is a thermal conductivity of the slider substrate and $\lambda l$ is a thermal conductivity of the light source support substrate.

Preferably, a heat insulation layer is disposed on an opposed surface to the light source support substrate in the slider substrate or on an opposed surface to the slider substrate in the light source support substrate.

These permit the heat generated by the light source to be guided through the light source support substrate to the outside, while minimizing transfer of the heat to the slider substrate.

Preferably, the slider substrate and the light source support substrate are fixed to each other with a UV cure type adhesive, whereby they can be readily and highly accurately fixed to each other without application of heat, by applying UV after alignment thereof.

Preferably, in the magnetic head portion the waveguide is located between the magnetic recording element and the slider substrate.

Since the recording medium normally moves in the direction from the slider substrate toward the head portion with respect to the medium-facing surface, the above configuration provides an effect of first heating the medium by action of light entering the waveguide and thereafter applying the magnetic field generated from the magnetic recording element, to the heated region.

Preferably, the magnetic head portion further comprises a magnetic detecting element, and the waveguide is located between the magnetic recording element and the magnetic detecting element.

This decreases a time from the heating of the medium to the application of the recording magnetic field, and permits the recording magnetic field to be applied to the medium before significant decrease in the temperature of the medium. As a result, the heating temperature can be lowered, and it provides an effect of reducing power consumption of the laser diode in the heating of the medium.

Preferably, the thermally assisted magnetic head further comprises a near-field light generator for generating near-field light, on an end face on the medium-facing surface side of the waveguide, whereby the near-field light can be readily generated.

The near-field light generator is, for example, an electrically conductive sheet of a triangular shape or the like when viewed from the medium-facing surface.

A head gimbal assembly according to the present invention is a head gimbal assembly comprising any one of the above-described thermally assisted magnetic heads, and a suspension supporting the thermally assisted magnetic head.

A hard disk drive according to the present invention comprises the above-described head gimbal assembly, and a magnetic recording medium.

Since the present invention improves the yield and permits application of the production methods of the conventional magnetic recording elements and simplification of the structure, high-density recording can be readily implemented by the thermally assisted magnetic recording.

DESCRIPTION OF THE PREFERRED EMBODIMENTS

Figure 2:
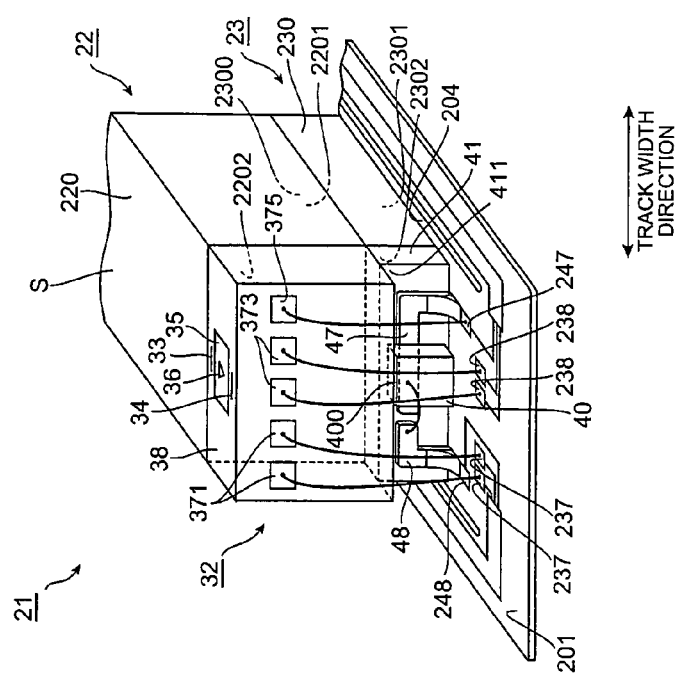
FIG. 2 is an enlarged perspective view of a part near a distal end of the HGA in FIG. 1.

Embodiments for carrying out the present invention will be described below in detail with reference to the accompanying drawings. In each of the drawings, the same elements will be denoted by the same reference numerals. It is also noted that the dimensional ratios in and between the constituent elements in the drawings are arbitrary, for easier understanding of the drawings.

Figure 1:
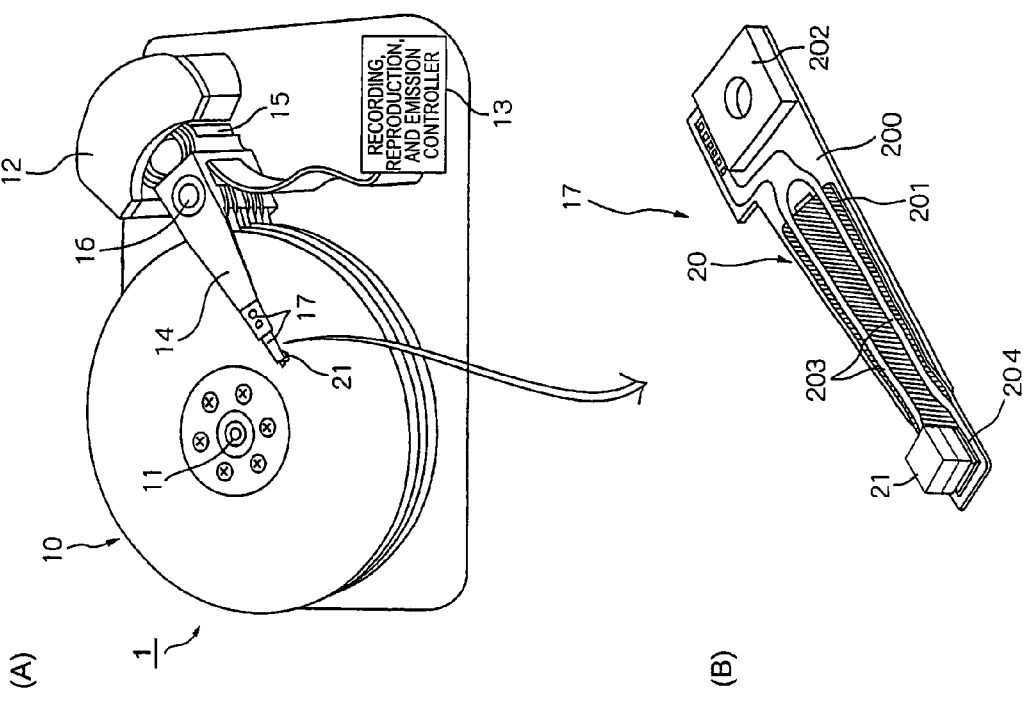
FIG. 1 is a perspective view schematically showing a configuration of a major part in an embodiment of a hard disk drive and HGA according to the present invention.

FIG. 1 is a perspective view schematically showing a configuration of a major part in an embodiment of the hard disk drive and HGA (head gimbal assembly) according to the present invention. FIG. 2 is an enlarged perspective view of a part near a thermally assisted magnetic head 21 in FIG. 1. In the perspective view of the HGA, the side of the HGA facing a surface of a magnetic disk is illustrated up.

(Hard Disk Drive)

In (A) of FIG. 1, the hard disk drive 1 has magnetic disks 10 consisting of a plurality of magnetic recording media to rotate around a rotation shaft of spindle motor 11, an assembly carriage device 12 for positioning each thermally assisted magnetic head 21 on a track, and a recording, reproduction, and emission control circuit (control circuit) 13 for controlling writing and reading operations of each thermally assisted magnetic head 21 and for controlling a laser diode as a light source for emitting laser light for thermally assisted magnetic recording, which will be detailed later.

The assembly carriage device 12 is provided with a plurality of drive arms 14. These drive arms 14 are angularly rockable around a pivot bearing shaft 16 by voice coil motor (VCM) 15, and are stacked in the direction along this shaft 16. An HGA 17 is attached to the distal end of each drive arm 14. Each HGA 17 is provided with a thermally assisted magnetic head 21 so that it faces the surface of each magnetic disk 10. The surface of the magnetic head 21 facing the surface of the magnetic disk 10 is a medium-facing surface S (which is also called an air bearing surface) of the thermally assisted magnetic head 21. The number of each of magnetic disks 10, drive arms 14, HGAs 17, and thermally assisted magnetic heads 21 may be one.

(HGA)

The HGA 17 is constructed, as shown in (B) of FIG. 1, by fixing the thermally assisted magnetic head 21 to a distal end of suspension 20 and electrically connecting one end of wiring member 203 to terminal electrodes of the thermally assisted magnetic head 21. The suspension 20 is composed mainly of a load beam 200, a flexure 201 with elasticity fixed and supported on this load beam 200, a tongue portion 204 formed in a plate spring shape at the tip of the flexure, a base plate 202 disposed on the base part of the load beam 200, and a wiring member 203 disposed on the flexure 201 and consisting of a lead conductor and connection pads electrically connected to the both ends of the lead conductor.

The wiring member, as shown in FIG. 2, has a pair of electrode pads 237, 237 for recording signal, a pair of electrode pads 238, 238 for readout signal, and a pair of electrode pads 247, 248 for driving of the light source.

It is obvious that the structure of the suspension in the HGA 17 of the present invention is not limited to the above-described structure. An IC chip for driving of the head may be mounted midway in the suspension 20, though not shown.

(Thermally Assisted Magnetic Head)

Figure 3:
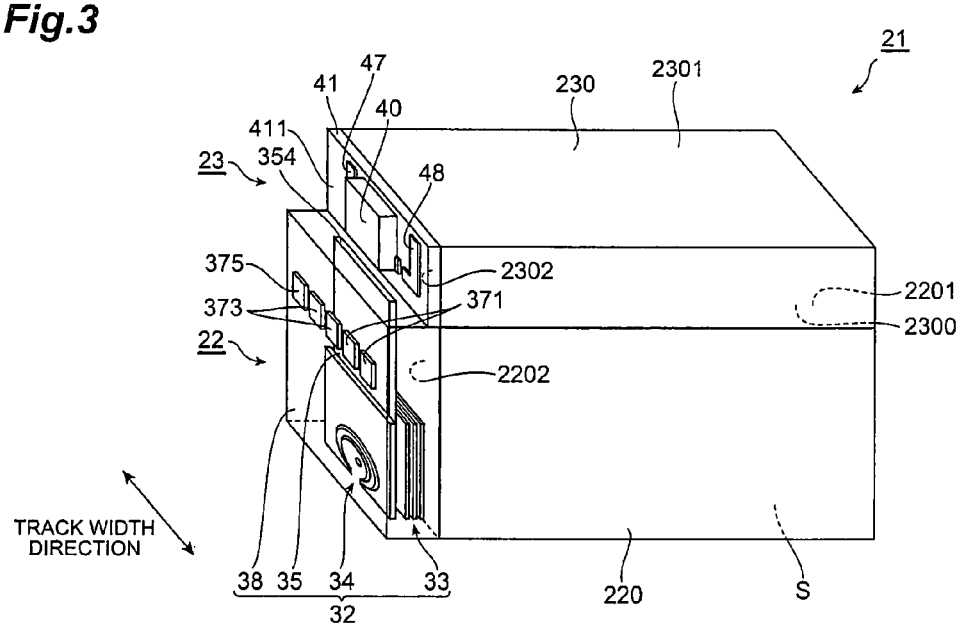
FIG. 3 is a perspective view schematically showing a configuration of a thermally assisted magnetic head in FIG. 1.
Figure 4:
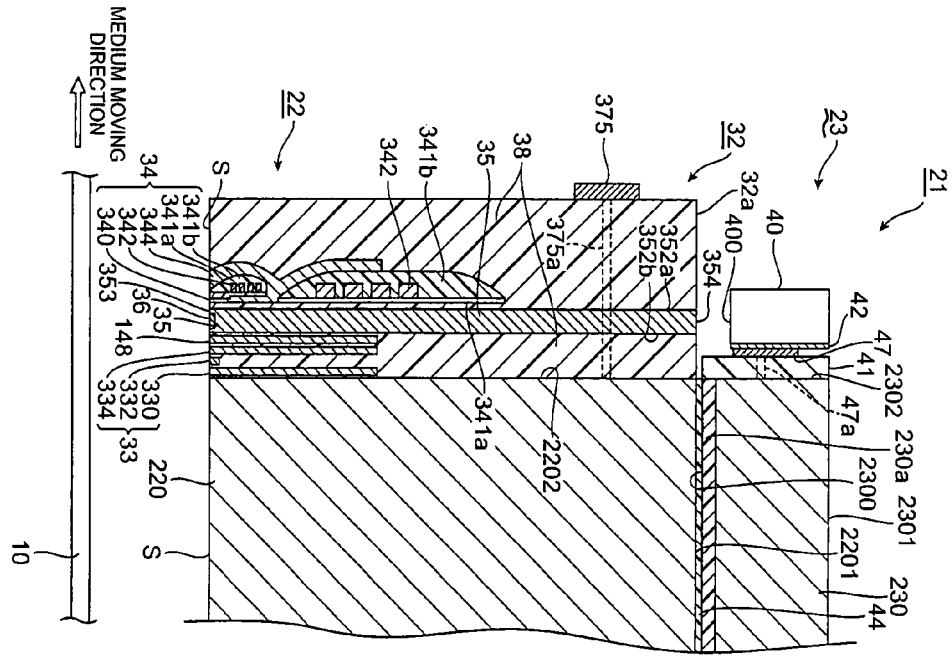
FIG. 4 is a sectional view perpendicular to a medium-facing surface of the thermally assisted magnetic head in FIG. 3.

As shown in FIGS. 2 to 4, the thermally assisted magnetic head 21 has a configuration in which a slider 22, and a light source unit 23 having a light source support substrate 230 and a laser diode 40 as a light source for thermally assisted magnetic recording are bonded and fixed to each other so that a back surface 2201 of a slider substrate 220 is in contact with a bond surface 2300 of the light source support substrate 230. The back surface 2201 of the slider substrate 220 herein is a surface opposite to the medium-facing surface S of the slider 22. A bottom surface 2301 of the light source support substrate 230 is bonded to the tongue portion 204 of the flexure 201, for example, with an adhesive such as epoxy resin.

(Slider)

The slider 22 has a slider substrate 220, and a magnetic head portion 32 for performing writing and reading of data signal.

The slider substrate 220 is of a plate shape and has the medium-facing surface S processed so as to achieve an appropriate levitation amount. The slider substrate 220 is made of electrically conductive AlTiC ($Al_2O_3$—TiC) or the like.

The magnetic head portion 32 is formed on an integration surface 2202 which is a side surface approximately perpendicular to the medium-facing surface S of the slider substrate 220. The magnetic head portion 32 has an MR effect element 33 as a magnetic detecting element for detecting magnetic information, an electromagnetic coil element 34 as a perpendicular (or, possibly, longitudinal) magnetic recording element for writing magnetic information by generation of a magnetic field, a waveguide 35 as a planar waveguide provided through between the MR effect element 33 and the electromagnetic coil element 34, a near-field light generator 36 for generating near-field light for heating a recording layer portion of a magnetic disk, an insulating layer 38 formed on the integration surface 2202 so as to cover these MR effect element 33, electromagnetic coil element 34, waveguide 35, and near-field light generator 36, a pair of electrode pads 371, 371 for signal terminals exposed from the layer surface of the insulating layer 38 and connected to the MR effect element 33, a pair of electrode pads 373, 373 for signal terminals connected to the electromagnetic coil element 34, and an electrode pad 375 for ground electrically connected to the slider substrate 220. The end faces of the MR effect element 33, electromagnetic coil element 34, and near-field light generator 36 are exposed in the medium-facing surface S. Each of the elements will be described below in detail.

FIG. 4 is a sectional view of the part near the magnetic head portion of the thermally assisted magnetic head 21. As shown in FIG. 4, the MR effect element 33 includes an MR laminate 332, and a lower shield layer 330 and an upper shield layer 334 located at respective positions on both sides of this MR laminate 332. The lower shield layer 330 and the upper shield layer 334 can be made, for example, of a magnetic material of NiFe, CoFeNi, CoFe, FeN, FeZrN, or the like and in the thickness of about 0.5-3 μm by a pattern plating method including a frame plating method, or the like. The upper and lower shield layers 334 and 330 prevent the MR laminate 332 from being affected by an external magnetic field serving as noise.

The MR laminate 332 includes a magneto-resistance effect film such as an in-plane conduction type (CIP (Current In Plane)) Giant Magneto Resistance (GMR) multilayer film, a perpendicular conduction type (CPP (Current Perpendicular to Plane)) GMR multilayer film, or a Tunnel Magneto Resistance (TMR) multilayer film, and is sensitive to a signal magnetic field from the magnetic disk with very high sensitivity.

For example, when the MR laminate 332 includes a TMR effect multilayer film, it has a structure in which the following layers are stacked in order: an antiferromagnetic layer made of IrMn, PtMn, NiMn, RuRhMn, or the like and in the thickness of about 5-15 nm; a magnetization fixed layer comprised, for example, of CoFe or the like as a ferromagnetic material, or two layers of CoFe or the like with a nonmagnetic metal layer of Ru or the like in between, and having the magnetization direction fixed by the antiferromagnetic layer; a tunnel barrier layer of a nonmagnetic dielectric material made, for example, by oxidizing a metal film of Al, AlCu, or the like about 0.5-1 nm thick by oxygen introduced into a vacuum chamber, or by natural oxidation; and a magnetization free layer comprised, for example, of two layered films of CoFe or the like about 1 nm thick and NiFe or the like about 3-4 nm thick as a ferromagnetic material, and effecting tunnel exchange coupling through the tunnel barrier layer with the magnetization fixed layer.

An interelement shield layer 148 made of the same material as the lower shield layer 330 is formed between the MR effect element 33 and the waveguide 35. The interelement shield layer 148 performs a function of shielding the MR effect element 33 from a magnetic field generated by the electromagnetic coil element 34 and preventing external noise during readout. A backing coil portion may also be further formed between the interelement shield layer 148 and the waveguide 35. The backing coil portion generates a magnetic flux to cancel a magnetic flux loop generated by the electromagnetic coil element 34 and passing via the upper and lower electrode layers of the MR effect element 33, and thereby suppresses the Wide Area Track Erasure (WATE) phenomenon being an unwanted writing or erasing operation on the magnetic disk.

The insulating layer 38 made of alumina or the like is formed between the shield layers 330, 334 on the opposite side to the medium-facing surface S of the MR laminate 332, on the opposite side to the medium-facing surface S of the shield layers 330, 334, 148, between the lower shield layer 330 and the slider substrate 220, and between the interelement shield layer 148 and the waveguide 35.

When the MR laminate 332 includes a CIP-GMR multilayer film, upper and lower shield gap layers for insulation of alumina or the like are provided between each of the upper and lower shield layers 334 and 330, and the MR laminate 332. Furthermore, an MR lead conductor layer for supplying a sense current to the MR laminate 332 to extract reproduction output is formed though not shown. On the other hand, when the MR laminate 332 includes a CPP-GMR multilayer film or a TMR multilayer film, the upper and lower shield layers 334 and 330 also function as upper and lower electrode layers, respectively. In this case, the upper and lower shield gap layers and MR lead conductor layer are unnecessary and omitted.

A hard bias layer of a ferromagnetic material such as CoTa, CoCrPt, or CoPt, for applying a vertical bias magnetic field for stabilization of magnetic domains, is formed on both sides in the track width direction of the MR laminate 332, though not shown.

The electromagnetic coil element 34 is preferably one for perpendicular magnetic recording and, as shown in FIG. 4, has a main magnetic pole layer 340, a gap layer 341a, a coil insulating layer 341b, a coil layer 342, and an auxiliary magnetic pole layer 344.

Figure 5:
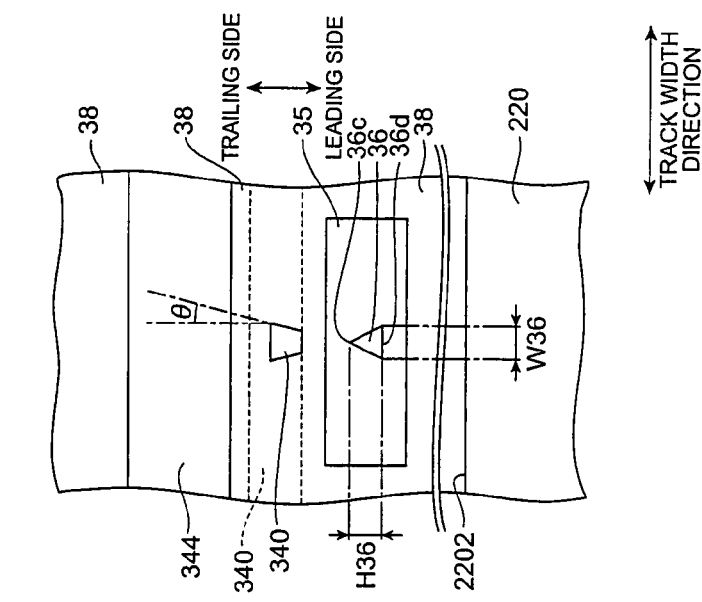
FIG. 5 is a schematic view from the medium-facing surface of the thermally assisted magnetic head in FIG. 4.

The main magnetic pole layer 340 is a magnetic guide for guiding a magnetic flux induced by the coil layer 342, up to the recording layer of the magnetic disk (medium) as a target of writing, while converging the magnetic flux. The end of the main magnetic pole layer 340 on the medium-facing surface S side preferably has a width in the track width direction (depth direction in FIG. 4) and a thickness in the stack direction (horizontal direction in FIG. 4) smaller than those of the other portions. This results in permitting the main magnetic pole layer to generate a fine and strong writing magnetic field adapted for high recording density. Specifically, for example, as shown in FIG. 5 which is a view of the magnetic head portion from the medium-facing surface S side, the tip of the main magnetic pole layer 340 on the medium-facing surface S side is preferably tapered in a shape of an inverted trapezoid whose length of the side on the leading side or slider substrate 220 side is shorter than the length of the side on the trailing side. Namely, the end face of the main magnetic pole layer 340 on the medium-facing surface side is provided with a bevel angle θ, in order to avoid unwanted writing or the like on an adjacent track by influence of a skew angle made by actuation with a rotary actuator. The magnitude of the bevel angle θ is, for example, approximately 15°. In practice, the writing magnetic field is generated mainly near the longer side on the trailing side and in the case of the magnetic dominant recording, the length of this longer side determines the width of the writing track.

Here the main magnetic pole layer 340 is preferably made, for example, in the total thickness of about 0.01 to about 0.5 μm at the end portion on the medium-facing surface S side and in the total thickness of about 0.5 to about 3.0 μm at the portions other than this end portion and, for example, of an alloy of two or three out of Ni, Fe, and Co by frame plating, sputtering, or the like, or an alloy containing the foregoing elements as main ingredients and doped with a predetermined element. The track width can be, for example, 100 nm.

As shown in FIG. 4, the end portion of the auxiliary magnetic pole layer 344 on the medium-facing surface S side forms a trailing shield portion wider in a layer section than the other portion of the auxiliary magnetic pole layer 344. The auxiliary magnetic pole layer 344 is opposed through the gap layer 341a and coil insulating layer 341b made of an insulating material such as alumina, to the end of the main magnetic pole layer 340 on the medium-facing surface S side. When the auxiliary magnetic pole layer 344 of this configuration is provided, the magnetic field gradient becomes steeper between the auxiliary magnetic pole layer 344 and the main magnetic pole layer 340 near the medium-facing surface S. This results in decreasing jitter of signal output and permitting decrease in the error rate during readout.

The auxiliary magnetic pole layer 344 is made, for example, in the thickness of about 0.5 to about 5 μm and, for example, of an alloy of two or three out of Ni, Fe, and Co by frame plating, sputtering, or the like, or an alloy containing these as principal ingredients and doped with a predetermined element.

The gap layer 341a separates the coil layer 342 from the main magnetic pole layer 340 and is made, for example, in the thickness of about 0.01 to about 0.5 µm and, for example, of $Al_2O_3$ or DLC or the like by sputtering, CVD, or the like.

The coil layer 342 is made, for example, in the thickness of about 0.5 to about 3 µm and, for example, of Cu or the like by frame plating or the like. The rear end of the main magnetic pole layer 340 is coupled with the portion of the auxiliary magnetic pole layer 344 apart from the medium-facing surface S and the coil layer 342 is formed so as to surround this coupling portion.

The coil insulating layer 341b separates the coil layer 342 from the auxiliary magnetic pole layer 344 and is made, for example, in the thickness of about 0.1 to about 5 µm and of an electric insulating material such as thermally cured alumina or resist layer or the like.

Figure 6:
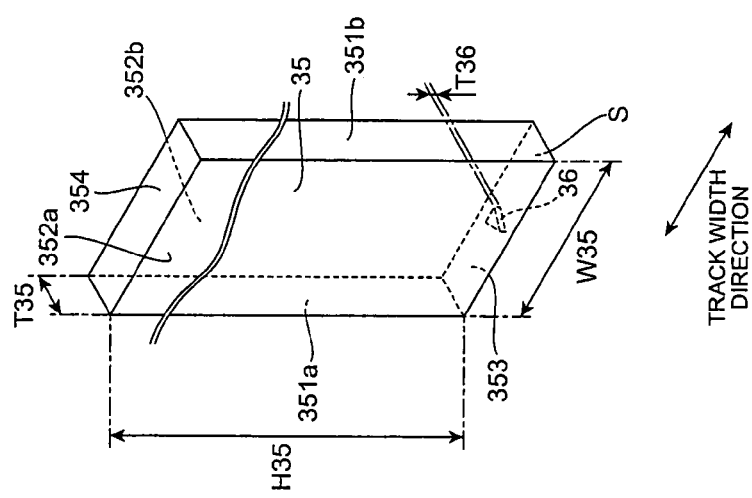
FIG. 6 is a perspective view showing a waveguide and a near-field light generator in the thermally assisted magnetic head in FIG. 3.

The waveguide 35 is located between the MR effect element 33 and the electromagnetic coil element 34, extends in parallel with the integration surface 2202, extends from the medium-facing surface S of the magnetic head portion 32 to the surface 32a opposite to the medium-facing surface of the magnetic head portion 32, and is of a rectangular plate shape, as shown in FIG. 6. The waveguide 35 has two side faces 351a, 351b opposed in the track width direction, and two upper face 352a and lower face 352b parallel to the integration surface 2202, all of which are formed perpendicularly to the medium-facing surface S, and the waveguide 35 also has an exit face 353 forming the medium-facing surface S, and an entrance face 354 opposite to the exit face 353. The upper face 352a, the lower face 352b, and the two side faces 351a, 351b of the waveguide 35 are in contact with the insulating layer 38 having the refractive index smaller than that of the waveguide 35 and functioning as a cladding for the waveguide 35.

This waveguide 35 is able to guide light incident through the entrance face 354, to the exit face 353 as the end face on the medium-facing surface S side, while reflecting the light on the two side faces 351a, 351b, the upper face 352a, and the lower face 352b. The width W35 of the waveguide 35 in the track width direction in FIG. 6 can be, for example, 1-200 µm, the thickness T35, for example, 2-10 µm, and the height H35 10-300 µm.

The waveguide 35 is made, for example, by sputtering or the like, from a dielectric material which has the refractive index n higher than that of the material making the insulating layer 38, everywhere. For example, in a case where the insulating layer 38 is made of $SiO_2$ (n=1.5), the waveguide 35 may be made of $Al_2O_3$ (n=1.63). Furthermore, in a case where the insulating layer 38 is made of $Al_2O_3$ (n=1.63), the waveguide 35 may be made of $Ta_2O_5$ (n=2.16), $Nb_2O_5$ (n=2.33), TiO (n=2.3-2.55), or $TiO_2$ (n=2.3-2.55). When the waveguide 35 is made of one of such materials, the total reflection condition is met at the interface, in addition to the good optical characteristics of the material itself, so as to decrease the propagation loss of laser light and increase the efficiency of generation of near-field light.

The near-field light generator 36, as shown in FIGS. 2, 4, 5, and 6, is a platelike member disposed nearly in the center of the exit face 353 of the waveguide 35. As shown in FIGS. 4 and 6, the near-field light generator 36 is buried in the exit face 353 of the waveguide 35 so that the end face thereof is exposed in the medium-facing surface S. As shown in FIG. 5, the near-field light generator 36 is of a triangular shape when viewed from the medium-facing surface S, and is made of an electroconductive material. The base 36d of the triangle is arranged in parallel with the integration surface 2202 of the slider substrate 220 or in parallel with the track width direction, and the vertex 36c facing the base is arranged on the main magnetic pole layer 340 side of the electromagnetic coil element 34 with respect to the base 36d; specifically, the vertex 36c is arranged opposite to the leading edge of the main magnetic pole layer 340. A preferred form of the near-field light generator 36 is an isosceles triangle whose two base angles at the two ends of the base 36d are equal to each other.

The near-field light generator 36 is preferably made of Au, Ag, Al, Cu, Pd, Pt, Rh, or Ir, or an alloy as a combination of two or more selected from the foregoing elements.

In FIG. 5, the radius of curvature of the vertex 36c is preferably 5-100 nm. The height H36 of the triangle is preferably sufficiently smaller than the wavelength of incident laser light and preferably 20-400 nm. The width W36 of the base 36d is preferably sufficiently smaller than the wavelength of incident laser light and preferably 20-400 nm. The thickness T36 of the near-field light generator 36 in FIG. 6 is preferably 10-100 nm.

When the near-field light generator 36 is disposed on the exit face 353 of the waveguide 35, the electric field is concentrated near the vertex 36c of the near-field light generator 36 and the near-field light is generated from near the vertex 36c toward the medium. This will be detailed later.

In this slider 22, as shown in FIG. 2, the electrode pads 371, 371 are electrically connected through bonding wires to the respective electrode pads 237, 237 of the flexure 201, and the electrode pads 373, 373 are connected through bonding wires to the respective electrode pads 238, 238 of the flexure 201; this configuration allows each of the electromagnetic coil element and the MR effect element to be driven. The electrode pad 375 electrically connected through a via hole 375a in FIG. 4 to the slider substrate 220 is connected through a bonding wire to the electrode pad 247 of the flexure 201, as shown in FIG. 2, whereby a potential of the slider substrate 220 can be controlled, for example, to the ground potential by the electrode pad 247.

(Light Source Unit)

The components of the light source unit 23 in the thermally assisted magnetic head 21 will be described below.

As shown in FIGS. 2 to 4, the light source unit 23 mainly has a light source support substrate 230 and a laser diode (light source) 40 whose contour is platelike.

The light source support substrate 230 is a substrate of AlTiC ($Al_2O_3$—TiC) or the like and has the bond surface 2300 bonded to the back surface 2201 of the slider substrate 220. As shown in FIG. 4, a heat insulation layer 230a of alumina or the like is formed on the bond surface 2300. An insulating layer 41 of an insulating material such as alumina is disposed on an element forming surface 2302 being one side surface when the bond surface 2300 is regarded as a bottom surface. The electrode pads 47, 48 are formed on this insulating layer 41, and the laser diode 40 is fixed on the electrode pad 47.

More specifically, as shown in FIGS. 2 and 3, the electrode pads 47, 48 are formed for driving of laser, on a surface 411 intersecting with the front surface of the insulating layer 41 and with the medium-facing surface S and, in other words, they are formed on the surface 411 parallel to the integration surface 2202 of the slider substrate 220. The electrode pad 47, as shown in FIG. 4, is electrically connected through a via hole 47a provided in the insulating layer 41, to the light source support substrate 230. The electrode pad 47 also functions as a heat sink for leading heat during driving of the laser diode 40 through the via hole 47a to the light source support substrate 230 side.

The electrode pad 47, as shown in FIG. 2, is formed so as to extend in the track width direction in the central region of the surface 411 of the insulating layer 41. On the other hand, the electrode pad 48 is formed at a position separate in the track width direction from the electrode pad 47. Each of the electrode pads 47, 48 further extends toward the flexure 201 side, for connection with the flexure 201 by solder reflow.

The electrode pads 47, 48 are electrically connected to the electrode pads 247, 248 of the flexure 201, respectively, by reflow soldering, whereby the light source can be driven. Since the electrode pad 47 is electrically connected to the light source support substrate 230 as described above, the potential of the light source support substrate 230 can be controlled, for example, to the ground potential by the electrode pad 247.

The electrode pads 47, 48 can be comprised, for example, of layers of Au, Cu, or the like made in the thickness of about 1-3 μm and by vacuum evaporation, sputtering, or the like, which are formed, for example, through a ground layer of Ta, Ti, or the like about 10 nm thick.

The laser diode 40 is electrically connected onto the electrode pad 47 by a solder layer 42 (cf. FIG. 4) of an electrically conductive solder material such as Au—Sn. At this time, the laser diode 40 is located relative to the electrode pad 47 so as to cover only a part of the electrode pad 47.

Figure 7:
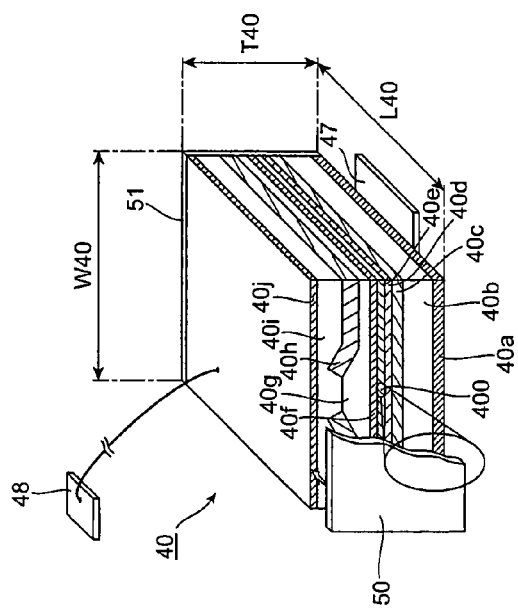
FIG. 7 is a schematic perspective view showing a configuration of a laser diode.

As shown in FIG. 7, the laser diode 40 may have the same structure as the one normally used for an optical disk storage, and, for example, has a structure in which the following layers are stacked in order: an n-electrode 40*a*; an n-GaAs substrate 40*b*; an n-InGaAlP cladding layer 40*c*; a first InGaAlP guide layer 40*d*; an active layer 40*e* consisting of multiple quantum wells (InGaP/InGaAlP) or the like; a second InGaAlP guide layer 40*f*; a p-InGaAlP cladding layer 40*g*; an *n-GaAs current blocking layer 40*h*; a p-GaAs contact layer 40*i*; a p-electrode 40*j*. Reflecting films 50 and 51 of $SiO_2$, $Al_2O_3$, or the like for exciting oscillation by total reflection are deposited before and after cleavage faces of the multilayer structure, and an aperture is provided at the position of the active layer 40*e* in one reflecting film 50, at an output end 400 for emission of laser light. The laser diode 40 of this configuration emits laser light from the output end 400 when a voltage is applied thereto in the film thickness direction.

The wavelength $\lambda_L$ of the emitted laser light is, for example, approximately 600-650 nm. It should be, however, noted that there is an appropriate excitation wavelength according to the metal material of the near-field light generator 36 (FIG. 2). For example, in a case where Au is used for the near-field light generator 36, the wavelength $\lambda_L$ of the laser light is preferably near 600 nm.

The size of the laser diode 40 is, for example, the width (W40) of 200-350 μm, the length (depth L40) of 250-600 μm, and the thickness (T40) of about 60-200 μm, as described above. The width W40 of the laser diode 40 can be decreased, for example, to about 100 μm, while the minimum thereof is a spacing between opposed ends of the current blocking layer 40*h*. However, the length of the laser diode 40 is the quantity associated with the electric current density and thus cannot be decreased so much. In either case, the laser diode 40 is preferably dimensioned in a sufficient size, in consideration of handling during mounting.

A power supply in the hard disk drive can be used for driving of this laser diode 40. In practice, the hard disk drive is usually equipped, for example, with the power supply of about 2 V, which is a sufficient voltage for the lasing operation. The power consumption of the laser diode 40 is also, for example, approximately several ten mW, which the power supply in the hard disk drive can fully provide.

In FIG. 4, the n-electrode 40*a* of the laser diode 40 is fixed to the electrode pad 47 by the solder layer 42 such as AuSn. The laser diode 40 is fixed to the light source support substrate 230 so that the output end 400 of the laser diode 40 is directed downward in FIG. 4, i.e., so that the output end 400 becomes parallel to the bond surface 2300; whereby the output end 400 can face the entrance face 354 of the waveguide 35 of the slider 22. In practical fixing of the laser diode 40, for example, an evaporated film of AuSn alloy is deposited in the thickness of about 0.7-1 μm on the surface of the electrode pad 47, the laser diode 40 is mounted thereon, and thereafter it is heated to be fixed, to about 200-300° C. by a hot plate or the like under a hot air blower. As shown in FIGS. 2 and 7, the electrode pad 48 is electrically connected through a bonding wire to the p-electrode 40*j* of the laser diode 40. The electrode connected to the electrode pad 47 may also be the p-electrode 40*j*, instead of the n-electrode 40*a*, and in this case, the n-electrode 40*a* is connected through a bonding wire to the electrode pad 48.

In the case of soldering with the aforementioned AuSn alloy, the light source unit is heated, for example, to the high temperature of about 300° C., but according to the present invention, this light source unit 23 is produced separately from the slider 22; therefore, the magnetic head portion in the slider is prevented from being adversely affected by this high temperature.

The back surface 2201 of the aforementioned slider 22 and the bond surface 2300 of the light source unit 23 are bonded, for example, with an adhesive layer 44 such as a UV cure type adhesive, as shown in FIG. 4, and the output end 400 of the laser diode 40 is arranged opposite to the entrance face 354 of the waveguide 35.

The configurations of the laser diode 40 and the electrode pads do not always have to be limited to those in the above-described embodiment, of course, and, for example, the laser diode 40 may be one of another configuration using other semiconductor materials, such as GaAlAs type materials. Furthermore, it is also possible to use any other brazing material, for the soldering between the laser diode 40 and the electrode. Yet furthermore, the laser diode 40 may be formed directly on the unit substrate by epitaxially growing the semiconductor materials.

(Production Method)

Subsequently, a method of producing the thermally assisted magnetic head described above will be described below briefly.

First, the slider 22 is produced. Specifically, the slider substrate 220 is prepared, the MR effect element 33 and interelement shield layer 148 are formed by well-known methods, and the insulating layer 38 of alumina or the like is further formed as a ground layer.

Figure 8:
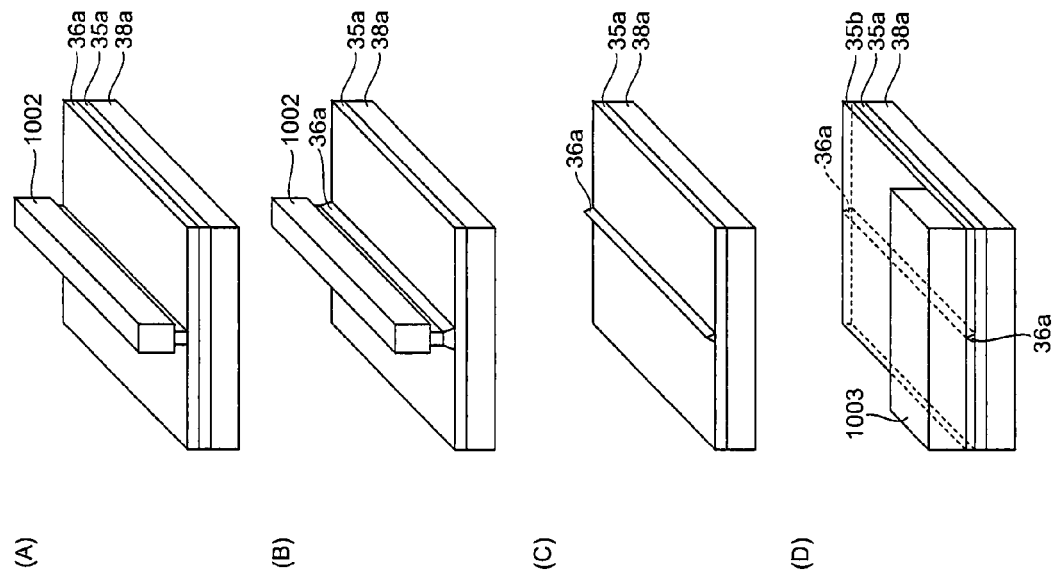
FIG. 8 is perspective views showing a production method of the waveguide and near-field light generator in order of (A)-(D).
Figure 9:
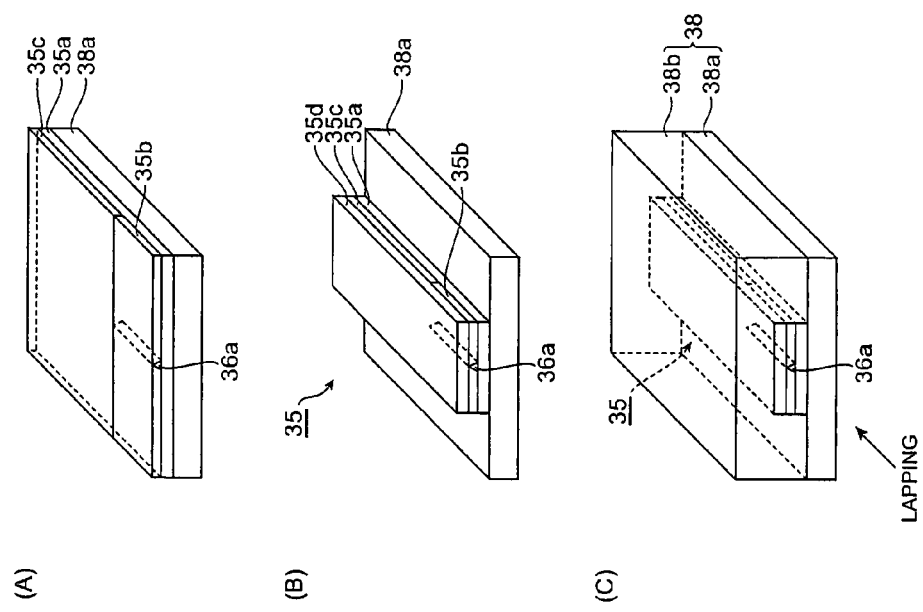
FIG. 9 is perspective views, subsequent to FIG. 8, showing the production method of the waveguide and near-field light generator in order of (A)-(C).

Subsequently, the waveguide 35 and near-field light generator 36 are formed. This process will be described in detail with reference to FIGS. 8 and 9. FIGS. 8 and 9 are perspective views to illustrate an embodiment of the method of forming the waveguide 35 and the near-field light generator 36.

In the first step, as shown in (A) of FIG. 8, a dielectric film 35*a* of $Ta_2O_5$ or the like with the refractive index higher than that of the insulating layer 38*a*, which will be a part of the waveguide 35, is first deposited on the insulating layer 38*a* of $Al_2O_3$ or the like, a metal layer 36*a* of Au or the like is then deposited thereon, and a resist pattern 1002 depressed for liftoff in the bottom part is formed thereon.

In the next step, as shown in (B) of FIG. 8, unnecessary portions of the metal layer 36*a* are removed except immediately below the resist pattern 1002 by ion milling or the like, thereby forming a pattern of the metal layer 36*a* of a trapezoid shape wider in the bottom as deposited on the dielectric film 35*a*.

In the subsequent step, as shown in (C) of FIG. 8, the resist pattern 1002 is removed, and a part of each slope is removed from the two slope sides of the metal layer 36*a* of the trapezoid shape by ion milling or the like, to form the metal layer 36a in a triangular sectional shape.

Subsequently, as shown in (D) of FIG. 8, a dielectric film 35b of the same material as the dielectric film 35a is deposited on the dielectric film 35a so as to cover the metal layer 36a, a resist pattern 1003 for formation of the end face of the metal layer 36a is laid on the side where the medium-facing surface will be formed, the metal layer 36a and the dielectric film 35b are removed by ion milling or the like, from the side opposite to the side where the medium-facing surface will be formed, as shown in (A) of FIG. 9, and thereafter a dielectric film 35c of the same material as the dielectric film 35b is deposited on the removed portion.

Furthermore, as shown in (B) of FIG. 9, a dielectric film 35d of the same material as the dielectric film 35b is further deposited on the dielectric films 35b, 35c, and the dielectric films 35a, 35b, 35c, 35d are patterned so as to achieve a predetermined width, thereby almost completing the waveguide 35.

Thereafter, as shown in (C) of FIG. 9, an insulating layer 38b of the same material as the insulating layer 38a is further formed so as to cover the waveguide 35, thereby completing the insulating layer 38 as a cladding layer. Then lapping is performed by a predetermined distance from the side where the metal layer 36a is exposed, as described later, to form the near-field light generator 36 of the predetermined thickness and the medium-facing surface S.

The above steps can form the waveguide 35 with the near-field light generator 36 therein.

After that, the electromagnetic coil element 34 is formed by the well-known method as shown in FIG. 4, and then the insulating layer 38 of alumina or the like is formed. Furthermore, the electrode pads 371 and others for connection are formed and thereafter lapping of the air bearing surface and the back surface thereof is performed to complete the slider 22. After this step, tests of the electromagnetic coil element 34 and the MR effect element 33 of slider 22 are conducted for each slider, to select a nondefective product.

Subsequently, the light source unit 23 is produced. In the first step, as shown in FIG. 4, the light source support substrate 230 of AlTiC or the like is prepared, the heat insulation layer 230a, insulating layer 41, and electrode pads 47, 48 are formed on the surfaces of the substrate by well-known methods, the laser diode 40 is fixed on the electrode pad 47 by an electrically conductive solder material such as AuSn, and thereafter the substrate is shaped into a predetermined size by separation by cutting or the like. This completes the light source unit 23. The light source unit obtained in this manner is also subjected to characteristic evaluation of the laser diode, particularly, observation of a profile of drive current by a high-temperature continuous conduction test, to select one considered to have a sufficiently long life.

Figure 10:
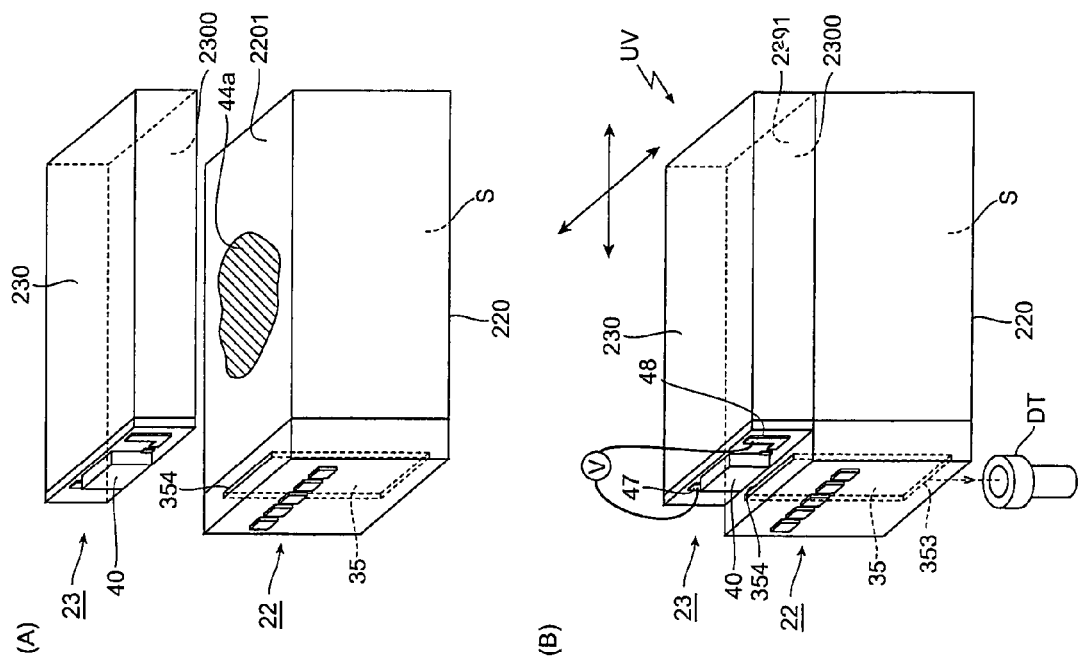
FIG. 10 is perspective views showing a production method of the thermally assisted magnetic head in order of (A) and (B).

After that, as shown in (A) of FIG. 10, a UV cure type adhesive 44a is applied onto either or both of the bond surface 2300 of the light source unit 23 as a nondefective unit and the back surface 2201 of the slider 22 as a nondefective unit. The UV cure type adhesive can be a UV cure type epoxy resin, a UV cure type acrylic resin, or the like.

Then, as shown in (B) of FIG. 10, the bond surface 2300 of the light source unit 23 and the back surface 2201 of the slider 22 are laid on each other, and then the laser diode 40 is activated with application of a voltage between the electrode pads 47, 48, and a photodetector DT is opposed to the exit face 353 of the waveguide 35. The light source unit 23 and the slider 22 are relatively moved in directions of arrows in (B) of FIG. 10 to find out a position where the output from the photodetector DT becomes maximum. At that position, UV light is applied from the outside onto the UV cure type adhesive to cure the UV cure type adhesive 44a, which can bond the light source unit 23 and the slider 22 to each other in a state in which the optical axis of the laser diode is aligned with the optical axis of the waveguide 35.

(Action)

Subsequently, the action of the thermally assisted magnetic head 21 according to the present embodiment will be described below.

During a writing or reading operation, the thermally assisted magnetic head 21 hydromechanically floats up by a predetermined levitation amount above the surface of the rotating magnetic disk (medium) 10. On this occasion, the ends on the medium-facing surface S side of the MR effect element 33 and the electromagnetic coil element 34 are opposed through a small spacing to the magnetic disk 10, thereby implementing readout by sensing of a data signal magnetic field and writing by application of a data signal magnetic field.

On the occasion of writing of a data signal, the laser light having propagated from the light source unit 23 through the waveguide 35 reaches the near-field light generator 36, whereupon the near-field light generator 36 generates the near-field light. This near-field light enables execution of thermally assisted magnetic recording as described below.

Here the near-field light generally has the maximum intensity at the border of the near-field light generator 36 when viewed from the medium-facing surface S, though it depends upon the wavelength of the incident laser light and the shape of the waveguide 35. Particularly, the present embodiment is arranged as follows in FIG. 4: the stack direction of the laser diode 40 is the horizontal direction in FIG. 4; the electric field vector of the light arriving at the near-field light generator 36 is the horizontal direction in FIG. 4, i.e., the vertical direction in FIG. 5. Therefore, radiation of the strongest near-field light occurs near the vertex 36c. Namely, the part facing the vicinity of this vertex 36c becomes a major heat-acting portion in the thermal assist action to heat a portion of the recording layer of the magnetic disk with light.

Since the electric field intensity of this near-field light is immeasurably stronger than that of the incident light, this very strong near-field light rapidly heats the opposed local part of the surface of the magnetic disk. This reduces the coercive force of this local part to a level allowing writing with the writing magnetic field, whereby writing with the electromagnetic coil element 34 becomes feasible even with use of the magnetic disk of a high coercive force for high-density recording. The near-field light penetrates to the depth of about 10-30 nm from the medium-facing surface S toward the surface of the magnetic disk. Therefore, under the present circumstances where the levitation amount is 10 nm or less, the near-field light can reach the recording layer part sufficiently. The width in the track width direction and the width in the medium moving direction of the near-field light generated in this manner are approximately equal to the aforementioned reach depth of the near-field light, and the electric field intensity of this near-field light exponentially decreases with increase in the distance; therefore, the near-field light can heat the recording layer part of the magnetic disk in an extremely localized area.

By adopting the thermally assisted magnetic recording as described above, it also becomes feasible to achieve, for example, the recording density of 1 Tbits/in$^2$ order, by performing writing on the magnetic disk of a high coercive force by means of the thin film magnetic head for perpendicular magnetic recording to record recording bits in an extremely fine size.

The present embodiment uses the light source unit 23, so that the laser light propagating in the direction parallel to the layer surface of the waveguide 35 can be made incident to the entrance face (end face) 354 of the waveguide 35 of the slider 22. Namely, the laser light of appropriate size and direction can be surely supplied in the thermally assisted magnetic head 21 having the configuration in which the integration surface 2202 and the medium-facing surface S are perpendicular to each other. As a result, it is feasible to implement the thermally assisted magnetic recording with high heating efficiency of the recording layer of the magnetic disk.

Since in the present embodiment the magnetic head portion 32 is fixed to the slider substrate 220 and the laser diode 40 as the light source is separately fixed to the light source support substrate 230, the thermally assisted magnetic head 21 as a nondefective product can be produced with a good yield by individually testing each of the electromagnetic coil element 34 fixed to the slider substrate 220 and the laser diode 40 fixed to the light source support substrate 230, and thereafter fixing the slider 22 as a nondefective unit and the light source unit 23 as a nondefective unit to each other.

Since the magnetic head portion 32 is disposed on the side surface of the slider substrate 220, the electromagnetic coil element 34, the MR effect element 33, and others of the magnetic head portion 32 can be readily formed by the production methods of the conventional thin film magnetic heads.

Furthermore, since the laser diode 40 is located at the position apart from the medium-facing surface S and near the slider 22, it is feasible to suppress the adverse effect of the heat generated from the laser diode 40, on the electromagnetic coil element 34, the MR effect element 33, etc., and the possibilities of contact or the like between the laser diode 40 and the magnetic disk 10, to reduce the propagation loss of light because of the dispensability of an optical fiber, a lens, a mirror, etc., and to simplify the structure of the entire magnetic recording apparatus.

Since in the present embodiment the heat insulation layer 230a is formed on the back surface of the light source support substrate 230, the heat generated from the laser diode 40 is less likely to be transferred to the slider 22.

In the above embodiment the slider substrate 220 and the light source support substrate 230 were the substrates of the same material of AlTiC, but it is also possible to use substrates of different materials. In this case, where the thermal conductivity of the slider substrate 220 is $\lambda s$ and the thermal conductivity of the light source support substrate 230 is $\lambda l$, they are preferably selected to satisfy $\lambda s \leq \lambda l$. This facilitates the transfer of the heat generated by the laser diode 40, through the light source support substrate 230 to the outside while minimizing the transfer of the heat to the slider substrate 220.

The sizes of the slider 22 and the light source unit 23 are arbitrary, but the slider 22 may be, for example, a so-called femtoslider having the width of 700 µm in the track width direction×length (depth) of 850 µm×thickness of 230 µm. In this case, the light source unit 23 can have the width and length approximately equal to them. In fact, the typical size of the ordinary laser diode is approximately the width of 250 µm×length (depth) of 350 µm×thickness of 65 µm, and the laser diode 40 of this size can be adequately mounted, for example, on the side surface of the light source support substrate 230 of this size. It is also possible to make a groove in the bottom surface of the light source support substrate 230 and locate the laser diode 40 in this groove.

The spot of the far field pattern of the laser light reaching the entrance face 354 of the waveguide 35 can be made in the size in the track width direction, for example, of about 0.5-1.0 µm and the size perpendicular to the foregoing size, for example, of about 1-5 µm. In correspondence thereto, the thickness T35 of the waveguide 35 receiving this laser light is preferably, for example, about 2-10 µm so as to be larger than the spot and the width (W35) in the track width direction of the waveguide 35 is preferably, for example, about 1-200 µm.

The electromagnetic coil element 34 may be one for longitudinal magnetic recording. In this case, a lower magnetic pole layer and an upper magnetic pole layer are provided instead of the main magnetic pole layer 340 and the auxiliary magnetic pole layer 344, and a writing gap layer is interposed between the ends on the medium-facing surface S side of the lower magnetic pole layer and the upper magnetic pole layer. Writing is implemented by a leakage magnetic field from the position of this writing gap layer.

The shape of the near-field light generator is not limited to the one described above, either, and it can also be, for example, a trapezoid shape resulting from truncation of the vertex 36c, instead of the triangular shape. It is also possible to adopt a so-called "bow tie type" structure in which a pair of sheets of a triangular shape or a trapezoidal shape are opposed to each other with their vertices or shorter sides being spaced by a predetermined distance. In this "bow tie type" structure, a very strong electric field is concentrated in the central region thereof.

The coil layer 342 is one layer in FIG. 4 and others, but it may be two or more layers, or a helical coil.

In another embodiment, the near-field light generator 36 may be a small aperture smaller than the wavelength of light, disposed on the medium-facing surface S side of the waveguide 35.

The heat insulation layer 230a may be formed on the back surface 2201 of the slider substrate 220, and the present invention can also be carried out without the heat insulation layer.

The bonding between the light source unit 23 and the slider 22 can also be implemented with any adhesive other than the UV cure type adhesive, e.g., with a solder layer of AuSn or the like which was used in the bonding between the laser diode 40 and the electrode pad 47.

It should be noted that the above-described embodiments all were described as illustrative of the present invention but not restrictive of the invention, and that the present invention can also be carried out in a variety of other modification and change forms. Therefore, the scope of the present invention should be defined by the scope of claims and scope of equivalents thereof only.

What is claimed is:

1. A thermally assisted magnetic head comprising:
a slider having a medium-facing surface; and
a light source unit having a light source support substrate and a light source disposed on the light source support substrate, wherein
the slider has a slider substrate and a magnetic head portion disposed on a side of the medium-facing surface in the slider substrate;
the magnetic head portion comprises a magnetic recording element for generating a magnetic field, and a waveguide for receiving light through an end face thereof opposite to the medium-facing surface, and guiding the light to the medium-facing surface;
the light source support substrate is fixed to a surface opposite to the medium-facing surface in the slider substrate so that light emitted from the light source can enter the end face of the waveguide;
the light source is disposed on a side surface of the light source support substrate;

the light source unit has an insulating layer and an electrode pad for applying a voltage to the light source to activate the light source;

the insulating layer and the electrode pad are provided between the light source and the light source support substrate; and the electrode pad is provided between the light source and the insulating layer.

2. The thermally assisted magnetic head according to claim 1, wherein the light source is a laser diode.

3. The thermally assisted magnetic head according to claim 1, wherein $\lambda s \leq \lambda 1$ is satisfied, where $\lambda s$ is a thermal conductivity of the slider substrate and $\lambda 1$ is a thermal conductivity of the light source support substrate.

4. The thermally assisted magnetic head according to claim 1, wherein a heat insulation layer is disposed on an opposed surface to the light source support substrate in the slider substrate or on an opposed surface to the slider substrate in the light source support substrate.

5. The thermally assisted magnetic head according to claim 1, wherein the slider substrate and the light source support substrate are fixed to each other with a UV cure type adhesive.

6. The thermally assisted magnetic head according to claim 1, wherein in the magnetic head portion the waveguide is located between the magnetic recording element and the slider substrate.

7. The thermally assisted magnetic head according to claim 6, wherein the magnetic head portion further comprises a magnetic detecting element, and wherein the waveguide is located between the magnetic recording element and the magnetic detecting element.

8. The thermally assisted magnetic head according to claim 1, further comprising a near-field light generator for generating near-field light, on an end face on the medium-facing surface side of the waveguide.

9. The thermally assisted magnetic head according to claim 8, wherein the near-field light generator is an electroconductive sheet of a triangular shape when viewed from the medium-facing surface.

10. A head gimbal assembly comprising the thermally assisted magnetic head as defined in claim 1, and a suspension supporting the thermally assisted magnetic head.

11. A hard disk drive comprising the head gimbal assembly as defined in claim 10, and a magnetic recording medium.

* * * * *